(12) United States Patent
Brieussel

(10) Patent No.: US 9,703,461 B2
(45) Date of Patent: Jul. 11, 2017

(54) MEDIA CONTENT CREATION

(71) Applicant: NXP B.V., Eindhoven (NL)

(72) Inventor: Benoit Brieussel, Vitry sur Seine (FR)

(73) Assignee: NXP B.V., Eindhoven (NL)

( * ) Notice: Subject to any disclaimer, the term of this patent is extended or adjusted under 35 U.S.C. 154(b) by 308 days.

(21) Appl. No.: 14/460,152

(22) Filed: Aug. 14, 2014

(65) Prior Publication Data

US 2015/0082168 A1 Mar. 19, 2015

(30) Foreign Application Priority Data

Sep. 18, 2013 (EP) .................................... 13290223

(51) Int. Cl.
*G06F 3/0482* (2013.01)
*G06F 3/0484* (2013.01)
*G06K 9/00* (2006.01)
*G11B 27/034* (2006.01)
*G11B 27/28* (2006.01)
*G11B 27/34* (2006.01)
*H04N 21/2187* (2011.01)
*H04N 21/234* (2011.01)
*H04N 21/8405* (2011.01)
*H04N 5/232* (2006.01)
(Continued)

(52) U.S. Cl.
CPC ........ *G06F 3/04842* (2013.01); *G06F 3/0484* (2013.01); *G06F 17/30852* (2013.01); *G06K 9/00751* (2013.01); *G11B 27/034* (2013.01); *G11B 27/10* (2013.01); *G11B 27/28* (2013.01); *G11B 27/34* (2013.01); *H04N 5/2327* (2013.01); *H04N 5/23245* (2013.01); *H04N 5/23254* (2013.01); *H04N 21/2187* (2013.01); *H04N 21/23418* (2013.01); *H04N 21/8405* (2013.01); *G06F 17/30784* (2013.01); *H04N 2101/00* (2013.01); *H04N 2201/0084* (2013.01)

(58) Field of Classification Search
CPC .................................................. G06F 3/04842
See application file for complete search history.

(56) References Cited

U.S. PATENT DOCUMENTS 6,424,795 B1 7/2002 Takahashi et al.
6,549,643 B1 4/2003 Toklu et al.
(Continued)

FOREIGN PATENT DOCUMENTS

EP    1 376 584 A2    1/2004
JP    2003-061038     2/2003
(Continued)

OTHER PUBLICATIONS

Ebrahimi, T. et al. "MPEG-7 Camera", Intl. Conf. on Image Processing, vol. 3, pp. 600-603 (Oct. 2001).
(Continued)

*Primary Examiner* — Peiyong Weng
(74) *Attorney, Agent, or Firm* — Rajeev Madnawat

(57) ABSTRACT

A method and apparatus for creating media content. The method comprises recording a video; while the video is being recorded, automatically analyzing the content of the video; and creating media content by editing the video, assisted by the results of the content-analysis. A user may not need to select in advance (that is, before the video is recorded) the type or format of media content to be created.

23 Claims, 2 Drawing Sheets

Figure 1:
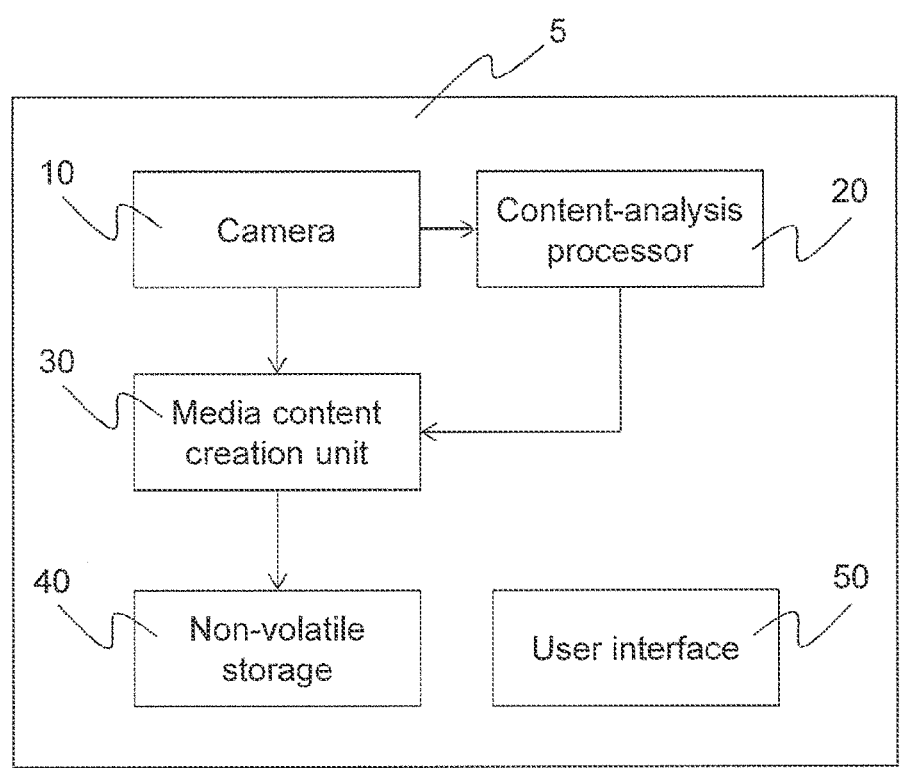

(51) Int. Cl.
*G11B 27/10* (2006.01)
*H04N 101/00* (2006.01)
*G06F 17/30* (2006.01)

(56) References Cited

U.S. PATENT DOCUMENTS

| | | | |
|---|---|---|---|
| 6,665,342 B1* | 12/2003 | Brown | G06T 7/2053 348/E5.054 |
| 7,675,550 B1 | 3/2010 | Linzer et al. | |
| 8,428,453 B1 | 4/2013 | Spiegel et al. | |
| 2005/0259958 A1* | 11/2005 | Johansson | G06F 17/30787 386/248 |
| 2011/0228114 A1* | 9/2011 | Tominaga | H04N 5/23248 348/208.6 |
| 2011/0242336 A1 | 10/2011 | Yamaji | |
| 2012/0002076 A1 | 1/2012 | Takahashi et al. | |
| 2012/0057852 A1* | 3/2012 | Devleeschouwer | G11B 27/034 386/278 |
| 2012/0148216 A1* | 6/2012 | Pavagada | H04N 5/772 386/278 |
| 2012/0162456 A1 | 6/2012 | Choi | |
| 2012/0230540 A1 | 9/2012 | Calman et al. | |
| 2012/0308209 A1* | 12/2012 | Zaletel | G11B 27/034 386/278 |
| 2013/0104080 A1* | 4/2013 | Bosworth | G06Q 10/10 715/838 |
| 2014/0098220 A1* | 4/2014 | Nunnink | H04N 5/232 348/135 |

FOREIGN PATENT DOCUMENTS

| | | |
|---|---|---|
| WO | 2004/043029 A2 | 5/2004 |
| WO | 2010/127418 A1 | 11/2010 |
| WO | 2013/133905 A1 | 9/2013 |

OTHER PUBLICATIONS

Liestol, G., "Augmented Reality and Digital Genre Design—Situated Simulations on the iPhone" IEEE Intl. Symp. on Mixed and Augmented Reality—Arts, Media and Humanities,, pp. 29-34 (Oct. 2009).

Extended European Search Report for EP Patent Appln. No. 13290223.0 (Jan. 29, 0214).

* cited by examiner

MEDIA CONTENT CREATION

CROSS-REFERENCE TO RELATED APPLICATIONS

This application claims the priority under 35 U.S.C. §119 of European patent application no. 13290223.0, filed on Sep. 18, 2013, the contents of which are incorporated by reference herein.

This invention relates to a method and apparatus for creating media content, such as an image, a video, or an audio clip. It may be particularly relevant to the creation of content using a personal electronic device, such as a smartphone or digital camera, which incorporates a touch screen for user control/input.

Camera functions are commonly provided on mobile phones. Obviously, they are also provided in digital cameras (which are designed exclusively or mainly for this purpose). In both cases, it is known to provide a camera function that can be launched in one of two modes: a "Picture" mode and a "Video" mode.

In "Picture" mode, an on-screen preview is displayed to the user on a display screen, showing the scene currently being viewed through the camera lens. The user can press/touch a soft or hard button to capture the scene, resulting in the creation of a picture. The quality of the captured picture typically depends on camera application parameters that may be preset for the Picture mode, such as image-resolution, flash-mode and panorama.

In "Video" mode, a preview is again displayed to the user, who can press/touch a soft or hard button to start, pause, and/or stop recording a video. While the video is being recorded, the screen shows the user the scene that is actually being recorded. The quality of the recorded video depends on certain preset parameters associated with the Video mode, such as resolution or white balance.

The user must select the mode (that is, Picture or Video) before creating the media content, and the type of content that is created depends on the mode that has been selected by the user. Also, there may be multiple kinds of pictures like Panorama or Duplicated-object-in-a-move. These parameters shall be set before creating the Picture content.

According to an aspect of the present invention, there is provided a method of creating media content, comprising:

recording a video;

while the video is being recorded, automatically analysing the content of the video; and creating media content by editing the video, assisted by the results of the content-analysis.

A user may not need to select in advance (that is, before the video is recorded) the type or format of media content to be created.

The present inventor has recognised that it is not always obvious which mode to choose, between conventional Picture and Video modes, or how to operate the user-interface of the camera to select the mode, once the choice has been made. The time taken to choose and to input the selection via the user-interface may result in missing the event that the user wished to capture. The user can also select the mode incorrectly and be unaware of his/her mistake—this will result in a picture being captured when the user really intended to capture a video, or vice versa.

According to embodiments of the present invention, the user does not need to decide in advance which mode to choose (that is, what type of content to create). As a related benefit, the user does not need to know how to operate the user-interface of the device before capturing the media content. This means that the user can start capturing the content more quickly, helping to ensure that fleeting events can be captured and not missed. In other words, latency can be reduced, between the user deciding to capture a picture or video and the start of capture.

When capturing a picture of a time-varying scene using a conventional "Picture" mode, the user may press/touch the capture button too early or too late, resulting in missing the "best" moment. For example, a subject may smile just before or just after the user actually presses the capture button. The present approach can also help to avoid this because it always captures a video. If the user wishes to create picture-content from the video, he/she can select a frame of the video in which the subject is smiling. This may help the user to capture smiles more successfully (or to capture more natural smiles, because the subject will not have to smile artificially for a long period, while waiting for the user to capture a picture).

When using embodiments of the present invention, the user can start the capture quickly, and can later decide the most appropriate format (picture or video) in which to permanently record the scene. The user can extract the "best" content (for example, the most relevant or most attractive scene, or the part of the video captured with the best quality).

Automatic content-analysis is performed while the video is being captured, to assist in the selection of the content to be extracted from the video. Performing content-analysis while the video is being captured (rather than afterwards) helps to further reduce delay, because the results of the analysis will be ready as soon as possible and therefore the media content can be created sooner.

The method may comprise: receiving from a user an instruction to capture media content; in response to the instruction, starting to record the video; stopping recording the video; and in response to stopping recording, creating the media content.

In this case, the device begins recording video in response to a specific user-action, such as pressing/touching a button. Recording may stop after a predetermined time or in response to a further user-action. Upon stopping recording, the device launches an editing mode to extract the media content from the video, assisted by the results of the content-analysis.

Alternatively, the method may comprises: continuously recording the video; and in response to the results of the content-analysis, creating the media content, while the video continues to be recorded.

In this case, the recording function is running permanently. For example, the video may be recorded to a circular buffer memory. The buffer memory stores enough video to allow the content analysis to be completed and to allow media content to be extracted from the video before the corresponding part of the video is overwritten in the buffer. For this type of implementation, it may be advantageous if the media content is created automatically from the video, without the need for user-input (see below). For example, the device may automatically extract media content such as one or more pictures, video segments or audio clips and suggest these to the user. The user can later decide whether or not to permanently save or share these suggested media content items. A possible difference with this implementation is that the whole video might not be retained for manual or semi-automatic editing by the user. Therefore, if the user does not like the automatically extracted media content, there is no opportunity to select different content. On the other hand, the media content can be created with minimal user input.

The step of creating the media content preferably comprises extracting from the video one or more of: a video segment; a still image; and an audio clip.

The still image that is extracted may be a frame of the video (optionally with some image-processing function applied), or it may be a panorama image, generated by stitching together multiple frames.

The step of creating the media content may be semi-automatic, comprising: suggesting to a user the media content to create, based on the results of the content-analysis; receiving from the user a response to the suggestion; and creating the media content based on the user's response.

The step of creating the media content may alternatively be fully automatic, comprising: automatically creating the media content, based on the results of the content-analysis, without receiving further input from a user.

In this case further user input is not needed to create the media content from the video. The media content may be extracted from the video solely on the basis of the results of the automatic content-analysis.

The content analysis preferably comprises at least one of: detecting a segment of the video that is blurred; detecting a segment of the video that contains more motion than other segments; detecting a segment of the video containing substantially no motion; detecting a predetermined shape in one or more frames of the video; determining a focal distance of a scene in the video; determining an audio noise level in a segment of the video; detecting a smiling face in one or more frames of the video; detecting an object occluding a scene in the video (for example, detecting a segment of the video in which a finger is put on the lens); detecting a segment of the video exhibiting a predetermined camera motion (for example, panning, tilting or rotation; or, in particular, detecting a downward tilting of the camera, typically at the end of the recording); and detecting a change in lighting between at least two frames of the video (for example, detecting a video segment with a suddenly higher or lower level of lights).

These are examples of types of analysis that may be useful for selecting the best media content to extract from the video. A segment of the video can comprise one or more consecutive frames. Blurred segments can be detected so that they are not included in the created media content. Segments with lots of motion may be more interesting and may therefore be included in the media content. Segments with little or no motion may be uninteresting and may therefore be excluded. Alternatively, segments with little or no motion may be selected for creating picture content, so that motion blur is avoided as much as possible. Segments containing loud noise may be interesting and may therefore be included. Smiles may be considered attractive and interesting and may therefore be included. A moving shape with a certain long distance (that is a small shape compared to the total area of the Video recording) may result in an automatic zooming to this shape, and automatic zoomed tracking of this moving shape. A sudden different level of lights can be fixed automatically using a High Dynamic Range (HDR) algorithm. Panning movement could result in creating automatically a panorama picture. A rotated video segment could be suppressed or rotated in the opposite direction to correct it, when the orientation reaches a certain angle.

The method may further comprise saving the created media content in a storage medium and/or sharing the media content, for example by uploading it to an internet server.

Preferably, the resolution and compression quality used for video capture are sufficient that frames of the video are acceptable for use as pictures. For example, the video recording resolution is preferably at least 4000 lines (corresponding to an 8 megapixel picture) and the compressed bit-rate is preferably 20 Mbps or higher.

Also provided is a computer program comprising computer program code means adapted to perform all the steps of any preceding claim when said program is run on a computer, and such a computer program embodied on a non-transitory computer readable medium.

According to another aspect of the invention there is provided a personal electronic device operable to create media content, the device comprising:

a camera, for recording a video;

a content-analysis processor, adapted to automatically analyse the content of the video, while the video is being recorded; and a media content creation unit, adapted create media content by editing the video, assisted by the results of the content-analysis.

The device may further comprise an input interface for receiving from a user an instruction to capture media content, wherein the camera is adapted to: start recording the video, in response to the instruction; and stop recording the video, and wherein the media content creation unit is adapted to create the media content in response to the camera stopping recording of the video.

The camera may be adapted to record the video continuously; and the media content creation unit may be adapted to create the media content in response to the results of the content-analysis, while the camera continues to record the video.

The media content creation unit is preferably adapted to create the media content by extracting from the video one or more of: a video segment; a still image; and an audio clip.

The content-analysis processor is preferably adapted to analyse the content of the video in at least one of the following ways: detecting a segment of the video that is blurred; detecting a segment of the video that contains more motion than other segments; detecting a segment of the video containing substantially no motion; detecting a predetermined shape in one or more frames of the video; determining a focal distance of a scene in the video; determining an audio noise level in a segment of the video; detecting a smiling face in one or more frames of the video; detecting an object occluding a scene in the video; detecting a video segment exhibiting predetermined camera motion; and detecting a change in lighting between at least two frames of the video.

Figure 2:
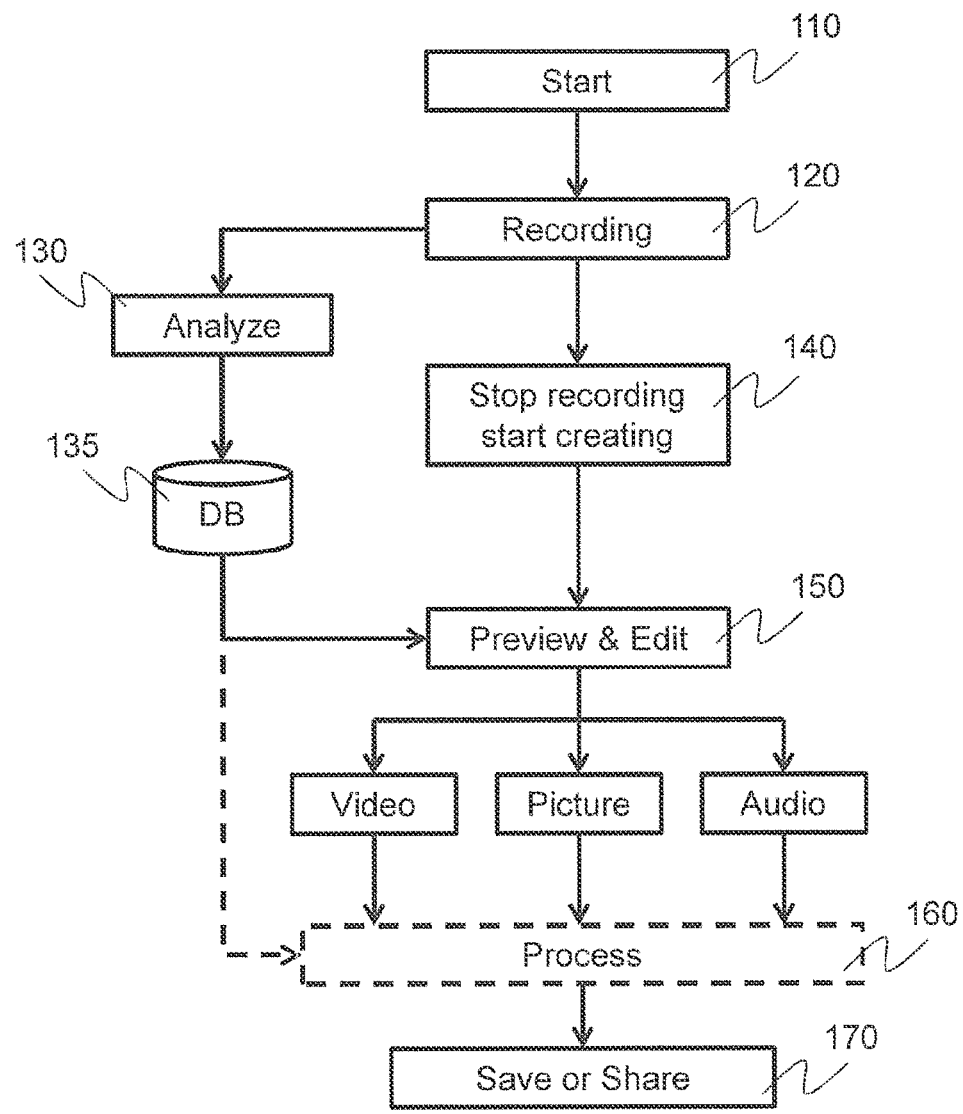

The invention will now be described by way of example with reference to the accompanying drawings, in which:

FIG. 1 is a block diagram showing a personal electronic device according to an embodiment of the invention; and FIG. 2 is a flow-chart illustrating a method performed by the personal electronic device of FIG. 1.

FIG. 1 shows a personal electronic device 5 according to an embodiment of the invention. In this example, the device 5 is a smart-phone with a touch-screen. The device 5 has a camera 10 for recording video. A content analysis processor 20 is coupled to the camera. It is operable to receive the video recorded by the camera and to automatically analyse the content of the video, in order to assist in media content creation. A media content creation unit 30 is also coupled to the camera and operable to receive the video recorded by the camera. The unit 30 is also coupled to the content-analysis processor 20, for receiving the results of the content-analysis. The media content creation unit 30 is adapted create media content by editing the video recorded by the camera 10, using the results of the content-analysis from the content-analysis processor 20. An output of the media content creation unit 30 is coupled to a non-volatile storage 40. The media content created by the media content creation unit 30 is transferred to the storage 40 to be stored. A user interface 50 is also provided, for controlling the video recording and content creation process. In this example, the user interface 50 is presented to the user and obtains user-input via the touch-sensitive screen of the smart phone 5.

Note that the functions of the media content creation unit 30 and the content analysis processor 20 may be fulfilled by a single microprocessor in some embodiments.

FIG. 2 illustrates a method performed by the device 5 according to an embodiment of the invention. In step 110, the device receives an instruction from the user (via the user interface 50) to begin recording video. To input this instruction, the user touches a soft button on the screen of the smart phone. In response, the camera 10 starts recording video (step 120). While the camera is recording the video, the content-analysis processor 20 processes it (step 130) to analyse its visual and/or auditory content. The result of the analysis is metadata about the video content, which is stored in a database 135. In step 140, when the event that the user wished to capture has finished, the user inputs a "stop" instruction, via the user interface 50. Upon receipt of this instruction the camera 50 stops recording the video and the device 5 automatically enters a media content creation mode. In this mode, the media content creation unit 30 presents to the user a preview of the content to be created and/or allows the user to edit the video to create the content (step 150). To do this, the media content creation unit 30 retrieves the metadata produced by the content analysis processor 20 from the database 135. This metadata is used to select one or more items of media content, which are suggested to the user to be created. The media content to be created may include one or more videos, pictures, and/or audio clips. The user can adjust (edit) the selections suggested by the media content creation unit 30, until he/she is satisfied with the media content. Once the user is satisfied, the items of media content are created and either saved in the non-volatile storage 40 or shared (for example, by uploading to the internet).

Optionally, the content extracted from the video can also be processed by the media content creation unit 30, based on the metadata containing the results of the content-analysis. For example, if the content-analysis suggests that a segment of video was blurred, the media content creation unit 30 can process the segment to sharpen it.

Various aspects of the process will now be described in greater detail.

The user interface 50 may be designed in various ways. In some embodiments, the button which starts recording (step 110) using the method of the invention may be presented to the user as a third option, next to buttons for selecting conventional Picture and Video modes. However, it may be desirable that the approach used in the present invention completely supersedes these conventional capture-modes. Therefore, it is also possible that the "mode" used in the present invention is the default mode or the only mode for creating media content. For example, the recording may start (step 110) as soon as the user selects a camera-application on their smartphone. Alternatively, when the user launches the camera-application, they may be presented with a single "Record" button, without any mode selection options.

During recording, using embodiments of the invention, some additional desirable features of the user interface 50 may be as follows: Pause/Resume recording can be done via a single touch on screen or a single hard-button press A hard or soft user interface control is provided for stopping the Video recording. This preferably stops the recording and moves automatically to the media content creation phase.

Exemplary types of content-analysis, performed during recording of the video, will now be described. The content-analysis processor 20 determines and stores some video properties that will help later on to suggest to the user possible media content to create; to assist the user in editing the video; and/or to fix the content (for example, enhance the image quality). The content analysis may result in logged metrics comprising metadata. Examples of this metadata include:

Start and end time of blurred scenes
Start and end time of scenes containing the greatest amount of motion
Start and end time of still scenes (scenes containing no motion)
Start and end time, and coordinates of a shape moving on a scene
Focus distance used when recording a scene
Audio quality, noise
Coordinates of the area surrounding a moving shape
Average level of brightness per frames or set of frames; average level of brightness for the entire Video
Start and end time, and direction of motion, for segments including panning and/or tilting camera motions
Start time and angle of rotation compared with the horizon, for segments including rotating camera motion
Smile detection Methods of analysing a video to determine such metadata will be familiar to those skilled in the art.

Exemplary controls in the user interface 50 for the user to use in the preview and editing phase (step 150) will now be described. The following controls may be available:

Skim inside the Video. The typical user interface for this is full screen Video. A left or right slide movement of the finger on the touchscreen moves one or more frames forwards or backwards in the video. The skim can also happen on a time-line bar, or a thumbnail bar.

The scale of the frame interval during skimming ("zoom" in time-line) can be adjusted in several ways:
  Via a user interface control option: pinch-in/-out, or a slider; or
  Automatically adjusted depending on: the speed of the finger movement when skimming, the video duration, the frame per second of the video.

A frame can be marked for extraction from the video, by touching (for example, tapping) on the screen. The current frame will then be extracted from the video as a picture and saved in the non-volatile storage 40 as an image file—for example in JPEG format.

A video segment can be marked for extraction from the video by setting the boundaries (start/end marks).

Cropping: if the end-user is not satisfied with the height and width of the video then the end-user can crop the extracted picture or video. Videos are usually recorded with a 16:9 aspect ratio. When creating a picture from such a video, the 16:9 ratio may be undesirable as pictures are typically 4:3 or square. The Save or Share function could automatically crop to obtain the desired aspect ratio and no warping.

A function can be provided to remove a shape that the user does not wish to keep in the scene. For example, if the user wished to take a picture of a monument, but an unwanted bystander was also captured in the scene, the user could manually control the system to remove this person from the scene.

The results of the content-analysis are used to assist the user in creating the media content from the video. After content analysis has been completed by the content-analysis processor 20, the media content creation unit 30 can make suggestions to the user by displaying the following exemplary items on the screen:

- A single best picture as a recommendation for the User to save. The main criteria could be blur or sharpness level, smile, frame with maximum motion.
- Several best pictures as a recommendation to the User so that the end-user can choose among multiple pictures the one or more that are best for saving/sharing.
- The best place for start/end marks of a video segment if the analysis has found that a video segment is the most suitable type of content for representing the scene or event. The start/end marks are provided as recommendation and can be changed by the User during the media content creation phase (preview and editing step 150).
- Any fix or enhancement (step 160) for low quality of video that may be detected by the content analysis, such as: sharpening or de-blurring blurred scenes; stabilize shaking scenes; or providing a function to zoom to a moving shape.

The media content created from the video can be saved in the non-volatile storage 40 or shared with another device (step 170). When saving content, it may be possible to improve performance in several ways. For example, some operations, such as extracting a video segment from the video can be performed in compressed domain. In this case, the "save" function can be performed quickly, without the need to decode and re-encode the video. Examples of operations that can be performed in the compressed domain include cut or trim functionalities, and picture extraction. When an operation cannot be performed in the compressed domain, the video can be decoded, edited as desired, and then re-encoded. An example is zooming. Each frame of the content (or a sub-segment of the content) is decoded, zoomed, and then re-encoded. The decoding and re-encoding can be done using a hardware codec—potentially with multiple instances of the hardware codec, if capabilities allow it. Alternatively, the video can be decoded and re-encoded using a software codec on multiple CPUs of the electronic device 5.

Some functions to facilitate easier sharing can be provided:

- The file size can be compared to size constraints associated with the intended recipient or the communications network. If the file size is too big, a message can be displayed to the user to warn him/her of this fact.
- The picture or the Video can be downscaled to a lower resolution to reduce the file size.
- The media content (for example, a video segment) can be reduced in size to match bit-rate and frame-rate with resolution: if the resolution of the output file for the video segment is smaller than the native resolution at which the video was captured, then the bitrate may be reduced. During the "save" operation, the function to adapt the bitrate and frame-rate according to file-size target and resolution can be suggested automatically to the user, via the user interface 50.

Another embodiment of the invention will now be described. This embodiment is similar to the embodiment of FIGS. 1-2, except that some steps may be performed automatically, without needing user-input. The main differences from the embodiment described above are as follows.

The camera is adapted to continuously record video and the content-analysis processor is adapted to continuously analyse the video being recorded. Therefore, there is no need for the user to start and stop the recording. The media content creation unit determines media content to create, in real-time, using the metadata generated by the content analysis. In this way, the need for user input is reduced or eliminated. Media content is created from the video whenever the media content creation unit decides that there is interesting content to extract from the video stream. The media content (for example, pictures, video segments, or audio clips) can be saved or shared automatically.

Embodiments of the present invention are applicable to a wide range of electronic devices. Embodiments can be implemented with any device capable of video capture with suitable quality. The device should also have suitable Central Processing Unit (CPU) processing and Random Access Memory (RAM) capabilities. Examples of suitable devices include but are not limited to: mobile phones; tablet computing devices; digital still cameras; and portable devices with webcams. Here, portable means devices of a size and weight suitable for being carried by a human for significant periods of time.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of creating media content, comprising:
    recording a video without selecting either a picture mode or a video mode;
    while the video is being recorded and before a media content is generated from the recording, automatically perform analysis, by a processor, of the recording to select a part of the recording to be extracted; and
    creating the media content by editing the video, assisted by results of the analysis, wherein the editing involves display of recommended start and end marks of a video segment having a most suitable type of content based upon the analysis and determining whether the video segment should be recorded in the picture mode or the video mode.

2. The method of claim 1, further comprising:
receiving, from the user, an instruction to capture the media content;
in response to the instruction, starting to record the video;
stopping recording of the video; and
in response to stopping the recording, creating the media content.

3. The method of claim 2, further comprising:
receiving, from the user, an instruction to stop capturing the media content; and
in response to this instruction, stopping the recording of the video.

4. The method of claim 1, wherein the method comprises:
continuously recording the video; and
in response to the results of the content-analysis, creating the media content, while the video continues to be recorded.

5. The method of claim 1, wherein the step of creating the media content comprises extracting from the video one or more of a video segment, a still image, and an audio clip.

6. The method of claim 1, wherein the step of creating the media content is semi-automatic, comprising:
suggesting to the user the media content to create, based on the results of the content-analysis;
receiving, from the user, a response to the suggestion; and
creating the media content based on the user's response.

7. The method of claim 1, wherein the step of creating the media content is automatic, comprising:
automatically creating the media content, based on the results of the content-analysis, without receiving further input from the user.

8. The method of claim 1, further comprising:
detecting a segment of the video that is blurred.

9. A personal electronic device operable to create media content, the device comprising:
a camera, configured to record a video without selecting either a picture mode or a video mode;
a content-analysis processor, configured to automatically analyze the content of the video, while the video is being recorded and before a media content is generated from the recording, to select a part of the recording to be extracted; and
a media content creation unit, configured to create the media content by editing the video, assisted by results of the analysis, wherein the editing involves display of recommended start and end marks of a video segment having a most suitable type of content based upon the analysis and determining whether the video segment should be recorded in the picture mode or the video mode.

10. The device of claim 9, further comprising
an input interface configured to receive, from the user, an instruction to capture media content, wherein the camera is configured to start recording the video, in response to the instruction and stop the recording of the video, and the media content creation unit is configured to create the media content in response to the camera stopping the recording of the video.

11. The device of claim 9, wherein the camera is configured to record the video continuously and the media content creation unit is configured to create the media content in response to the results of the content-analysis, while the camera continues to record the video.

12. The device of claim 9, wherein the media content creation unit is configured to create the media content by extracting from the video one or more of a video segment, a still image, and an audio clip.

13. The device of claim 9, wherein the content-analysis processor is configured to analyze the content of the video by detecting a segment of the video that is blurred, detecting a segment of the video that contains more motion than other segments, detecting a segment of the video containing substantially no motion, detecting a predetermined shape in one or more frames of the video; determining a focal distance of a scene in the video, determining an audio noise level in a segment of the video, detecting a smiling face in one or more frames of the video, detecting an object occluding a scene in the video, detecting a video segment exhibiting predetermined camera motion, and detecting a change in lighting between at least two frames of the video.

14. A non-transitory computer readable medium configured to perform a method of creating media content when executed by a processor, the non-transitory computer readable medium comprising:
instructions for recording a video without selecting either a picture mode or a video mode;
instructions for automatically analyzing the content of the video while the video is being recorded and before a media content is generated from the recording, to select a part of the recording to be extracted; and
instructions for creating the media content by editing the video, assisted by results of the analysis, wherein the editing involves display of recommended start and end marks of a video segment having a most suitable type of content based upon the analysis and determining whether the video segment should be recorded in the picture mode or the video mode.

15. The method of claim 1, further comprising:
detecting a segment of the video that contains more motion than other segments.

16. The method of claim 1, further comprising:
detecting a segment of the video containing substantially no motion.

17. The method of claim 1, further comprising:
detecting a predetermined shape in one or more frames of the video.

18. The method of claim 1, further comprising:
determining a focal distance of a scene in the video.

19. The method of claim 1, further comprising:
determining an audio noise level in a segment of the video.

20. The method of claim 1, further comprising:
detecting a smiling face in one or more frames of the video.

21. The method of claim 1, further comprising:
detecting an object occluding a scene in the video.

22. The method of claim 1, further comprising:
detecting a video segment exhibiting predetermined camera motion.

23. The method of claim 1, further comprising:
detecting a change in lighting between at least two frames of the video.

* * * * *